UNITED STATES PATENT OFFICE.

HENRY MAUTHÉ, OF BOSTON, MASSACHUSETTS.

IMPROVEMENT IN ARTIFICIAL FUEL.

Specification forming part of Letters Patent No. 151,041, dated May 19, 1874; application filed March 26, 1874.

*To all whom it may concern:*

Be it known that I, HENRY MAUTHÉ, of Boston, in the county of Suffolk and State of Massachusetts, have invented an Improved Composition for Fuel, of which the following is a specification:

This invention has for its object the production of an article to be used as fuel, and as a substitute for coal, which can be supplied cheaper, is more economical to burn, will give more heat, produce no smoke nor odor while burning, more durable than coal, and can be easily and readily prepared for use and transportation.

The composition consists of the following ingredients and proportions: First, vegetable mold or loam, 51.76 per cent.; second, bituminous or anthracite coal dust, 42.85 per cent.; third, carbonate of soda, 0.52 per cent.; fourth, water, 4.87 per cent. Total, 100.

The process of mixing the above is as follows: Thoroughly mix the vegetable mold or loam and the coal-dust together. Then, dissolving the carbonate of soda in the water, mix the two compounds together, the solution of carbonate of soda acting as a kind of flux until they are thoroughly incorporated.

The composition now being in a pasty or plastic state is then placed in molds of suitable form—say, to represent small bricks, and by heavy pressure it is molded solid and compact. After being removed from the molds and thoroughly dried, the compound is ready for use as fuel, and is adapted to be packed for transportation.

The molds, instead of being of brick-shape, can be of any form desired, but for economy of space in transportation the form of a brick is best suited.

The many advantages of my improved composition for fuel are obvious, of which the following may be mentioned: The materials of which it is composed are cheap; the time and labor required to prepare the composition enables it to be produced or manufactured at a very slight cost; gives at least double the heat of the same quantity of coal; can be easily and readily kindled; produces no smoke or bad odor; and will burn as long as double the quantity of ordinary coal—thus, with all the above advantages, producing a compound that for cheapness, generation of heat, durability, and compactness for use and transportation, cannot be surpassed.

The pressing of the composition into a solid and compact mass is best, not only for transportation, but for the use for which it is intended, although it can be employed for fuel without submitting it to any more pressure than necessary to keep it together.

The proportions of the coal-dust and carbonate of soda can be changed somewhat, according as there is more or less of vegetable matter in the mold or loam; and I do not intend to limit myself to the exact proportions hereinabove specified, as they each or all can be varied in some degree, and yield equally good results, but I find from various experiments that the most satisfactory results are produced when the proportions are about or as above specified.

Having thus described my invention, what I claim, and desire to secure by Letters Patent, is—

A composition for fuel, consisting of vegetable mold or loam, coal-dust, carbonate of soda, and water, mixed together in the manner, and in about the proportions, herein set forth.

The above specification of my invention, signed by me this 23d day of March, A. D. 1874.

HENRY MAUTHÉ.

Witnesses:
EDWIN W. BROWN,
J. P. McELROY.